US005802286A

United States Patent [19]
Dere et al.

[11] Patent Number: 5,802,286
[45] Date of Patent: Sep. 1, 1998

[54] METHOD AND APPARATUS FOR CONFIGURING A VIRTUAL NETWORK

[75] Inventors: Judy Y. Dere, Saratoga; Leon Y. K. Leong, Monte Sereno; Daniel A. Simone, San Jose; Allan Thomson, Cupertino, all of Calif.

[73] Assignee: Bay Networks, Inc., Santa Clara, Calif.

[21] Appl. No.: 447,066

[22] Filed: May 22, 1995

[51] Int. Cl.$^6$ .................................................. G06F 13/00
[52] U.S. Cl. ........................... 395/200.5; 395/200.53; 370/254
[58] Field of Search ................ 395/200.01, 200.02, 395/200.1, 200.11, 200.5, 200.53, 200.56, 200.3; 370/254

[56] References Cited

U.S. PATENT DOCUMENTS

| | | | |
|---|---|---|---|
| 5,142,624 | 8/1992 | Patrick, II . | |
| 5,276,440 | 1/1994 | Jolissaint et al. | 340/825.02 |
| 5,307,465 | 4/1994 | Iki | 395/311 |
| 5,430,730 | 7/1995 | Sepulveda-Garese et al. | 370/94.3 |
| 5,497,460 | 3/1996 | Bailey et al. | 395/183.15 |
| 5,517,622 | 5/1996 | Ivanoff et al. | 395/200.13 |
| 5,583,862 | 12/1996 | Callon . | |
| 5,600,644 | 2/1997 | Chang et al. | 370/404 |
| 5,633,869 | 5/1997 | Burnett et al. . | |
| 5,684,959 | 11/1997 | Bhat et al. | 395/200.11 |

OTHER PUBLICATIONS

Weber et al., "An Optimization Method for Virtual Private Network Design", Private Switching Systems & Network, IEEE, 1992, pp. 31–36.

Landegem et al., "Managing a Connectionless Virtual Overlay Network on Top an ATM Network", Communications, 1991 IEEE International Conference, IEEE, 1991, pp. 988–992.

Ferrari et al., "Resource Patitioning for Real–Time Communication", Global Data Networking Symposium, IEEE, 1993, pp. 128–135.

*Primary Examiner*—Meng-Ai T. An
*Assistant Examiner*—Walter D. Davis, Jr.
*Attorney, Agent, or Firm*—Blakely, Sokoloff, Taylor & Zafman, LLP

[57] ABSTRACT

A method of configuring a network. The network includes some physical devices, some hosts, and a network management tool. The method comprises the following steps. First, generate a set of leaf nodes. Each leaf node includes at least one physical device and connects to at least one host. Next, generate an adjacency matrix from said set of leaf nodes. Next, generate a set of interconnect nodes, the interconnect nodes connect the set of leaf nodes. Next, determine the resource availability for the set of interconnect nodes. Finally, configure the set of interconnect nodes and the set of leaf nodes after determining that sufficient resources are available.

31 Claims, 9 Drawing Sheets

METHOD AND APPARATUS FOR CONFIGURING A VIRTUAL NETWORK

NOTICE

©1994, 1995 SynOptics Communications Inc. A portion of the disclosure of this patent document contains material which is subject to copyright protection. The copyright owner has no objection to the facsimile reproduction by anyone of the patent disclosure, as it appears in the Patent and Trademark Office patent file or the records, but otherwise reserves all copyright rights whatsoever.

BACKGROUND OF THE INVENTION

1. Field of the Invention

The present invention relates to the field of computer networking. In particular, the present invention describes a method and apparatus for configuring physical devices in a network to create a virtual network.

2. Description of Related Art

Computer networks continue to grow in size and complexity. In a network, physical devices are interconnected with communication media. Computers on the network may be grouped into virtual networks. A virtual network allows computers to appear to be physically connected on their own network. This enables, for example, all people in the finance department of a company to have their computers communicating in one virtual network.

One difficulty in creating virtual networks has been that a network administrator must configure the physical devices in the network. This configuration process can be very complex. For example, assume that the people of the finance department are located in a number of buildings on a campus. Ethernet networks, token ring networks, and ATM networks may connect all the computers used in the finance department. That is, one part of the department may be connected to the network using an ATM switch, while another part of the department may be connected to the network via an ethernet network. Finally, another part of the finance department may be connected via a token ring network.

To create a virtual network, the network administrator must determine whether all the computers of the finance department can be connected to form one virtual network. The administrator must also determine whether the network has sufficient resources to do this. Typically this process requires a great deal of time and effort on the part of the network administrator. Through a process of trial and error, the network administrator would attempt to configure a set of physical devices that would support the virtual network. If during the configuration process one physical device could not be configured (e.g. because insufficient resources were available at the device), the network administrator would have to determine a different set of physical devices. Sometimes the path would be longer than would be necessary, and therefore possibly less efficient. In other cases, not until multiple configuration attempts had been made would the network administrator realize that the desired virtual network could not be realized.

Further complications occur when multiple network administrators work on the same network. Each network administrator may not have an up to date understanding of the entire network.

Therefore, creating virtual networks can be complex and time consuming. What is needed is an improved method and apparatus for configuring a virtual network.

SUMMARY OF THE INVENTION

A method and apparatus for determining a connection path between two physical devices in a heterogeneous network is described.

A method of configuring a network. The network includes some physical devices, some hosts, and a network management tool. The method comprises the following steps. First, generate a set of leaf nodes. Each leaf node includes at least one physical device and connects to at least one host. Next, generate an adjacency matrix from said set of leaf nodes. Next, generate a set of interconnect nodes, the interconnect nodes connect the set of leaf nodes. Next, determine the resource availability for the set of interconnect nodes. Finally, configure the set of interconnect nodes and the set of leaf nodes after determining that sufficient resources are available.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW OF ONE EMBODIMENT OF THE PRESENT INVENTION

A method and apparatus for determining a connection path between two physical devices in a heterogeneous network is described. In the following description, specific details are set forth such as adjacency matrix contents, etc., in order to provided a thorough understanding of the present invention. In other instances, known circuits, structures and techniques have not been shown in detail in order not to obscure the present invention.

In one embodiment of the present invention, a network management tool connects to the network and configures a virtual network. The network management tool determines: the capabilities of the physical devices on the network; the necessary configuration information for each physical device; and, the physical links between the physical devices (that is, the network management tool determines all the interconnections between all the nodes in the network). Next, the network management tool finds the virtual network's leaf nodes and all the nodes that interconnect them. Then, the network management tool determines the availability of links between all the leaf nodes and the interconnect nodes. That is, the resource availability for the physical devices are checked and determined whether a path can be created between all the physical devices of the virtual network. Once the resource availability has been determined, the network management tool configures the virtual network nodes.

In another embodiment of the present invention, a network management tool modifies a presently existing network by adding a host to, or subtracting a host from, a virtual network.

DEFINITIONS

To aid in the understanding of this description, the following definitions are presented, Host: A terminal on a network. Typically, a host is a computer. Typically, a host will have a unique address within a virtual network.

Virtual Network (Vnet): In a network of physical devices, a vnet is a particular configuration of the physical devices that allows a group of hosts to communicate.

Node: A logical or physical device in a network.

Configuration Node: A configuration node is a node that can be configured to allow communication between media coupled to that configuration node; for example, a hub, a group of ethernet switches or an ATM network. In one embodiment of the present invention, knowledge of the internal topology of a switched network, such as an ATM network, is not needed. Therefore, related physical switching devices can be grouped into one logical configuration node.

Network Node List: The list of nodes in the network.

Leaf Node List: The list of nodes connected to the hosts that are to be in one vnet.

Interconnect Node List: The list of nodes that connect the leaf nodes. The nodes in the interconnect node list must be configured in order for the vnet to be created or modified.

Virtual Network Node List: the list of all the nodes which will be configured in the construction or modification of the virtual network.

Interconnection List: The list of connections (links) between configuration nodes.

A COMPUTER SYSTEM

Figure 1:
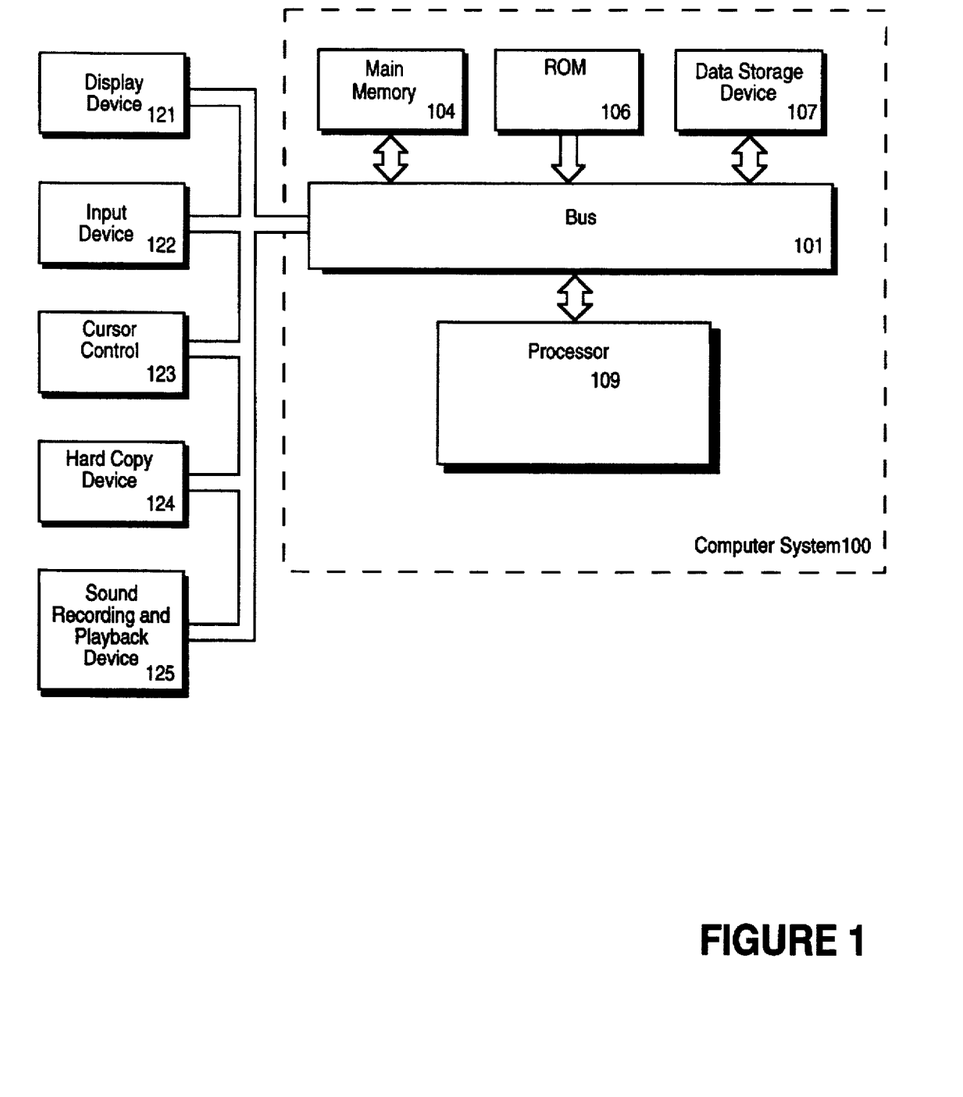
FIG. 1 illustrates a computer system upon which one embodiment of the present invention can be implemented.

FIG. 1 illustrates a computer system 100 upon which an embodiment of the invention can be implemented. The computer system 100 includes a bus 101, or other communications hardware and software, for communicating information, and a processor 109, coupled with the bus 101, is for processing information. The processor 109 can be a single processor or a number of individual processors that can work together. The computer system 100 further includes a memory 104. The memory 104 can be random access memory (RAM), or some other dynamic storage device. The memory 104 is coupled to the bus 101 and is for storing information and instructions to be executed by the processor 109. The memory 104 also may be used for storing temporary variables or other intermediate information during the execution of instructions by the processor 109. The computer system 100 also includes a ROM 106 (read only memory), and/or some other static storage device, coupled to the bus 101. The ROM 106 is for storing static information such as instructions or data.

The computer system 100 can optionally include a data storage device 107, such as a magnetic disk, a digital tape system, or an optical disk and a corresponding disk drive. The data storage device 107 can be coupled to the bus 101.

The computer system 100 can also include a display device 121 for displaying information to a user. The display device 121 can be coupled to the bus 101. The display device 121 can include a frame buffer, specialized graphics rendering devices, a cathode ray tube (CRT), and/or a flat panel display. The bus 101 can include a separate bus for use by the display device 121 alone.

An input device 122, including alphanumeric and other keys, is typically coupled to the bus 101 for communicating information, such as command selections, to the processor 109 from a user. Another type of user input device is a cursor control 123, such as a mouse, a trackball, a pen, a touch screen, a touch pad, a digital tablet, or cursor direction keys, for communicating direction information to the processor 109, and for controlling the cursor's movement on the display device 121. The cursor control 123 typically has two degrees of freedom, a first axis (e.g., x) and a second axis (e.g., y), which allows the cursor control 123 to specify positions in a plane. However, the computer system 100 is not limited to input devices with only two degrees of freedom.

Another device which may be optionally coupled to the bus 101 is a hard copy device 124 which may be used for printing instructions, data, or other information, on a medium such as paper, film, slides, or other types of media.

A sound recording and/or playback device 125 can optionally be coupled to the bus 101. For example, the sound recording and/or playback device 125 can include an audio digitizer coupled to a microphone for recording sounds. Further, the sound recording and/or playback device 125 may include speakers which are coupled to digital to analog (D/A) converter and an amplifier for playing back sounds.

A video input/output device 126 can optionally be coupled to the bus 101. The video input/output device 126 can be used to digitize video images from, for example, a television signal, a video cassette recorder, and/or a video camera. The video input/output device 126 can include a scanner for scanning printed images. The video input/output device 126 can generate a video signal for, for example, display by a television.

Also, the computer system 100 can be part of a computer network (for example, a LAN) using an optional network connector 127, being coupled to the bus 101. In one embodiment of the invention, an entire network can then also be considered to be part of the computer system 100.

An optional device 128 can optionally be coupled to the bus 101. The optional device 128 can include, for example, a PCMCIA card and a PCMCIA adapter. The optional device 128 can further include an optional device such as modem or a wireless network connection.

A NETWORK

Figure 2:
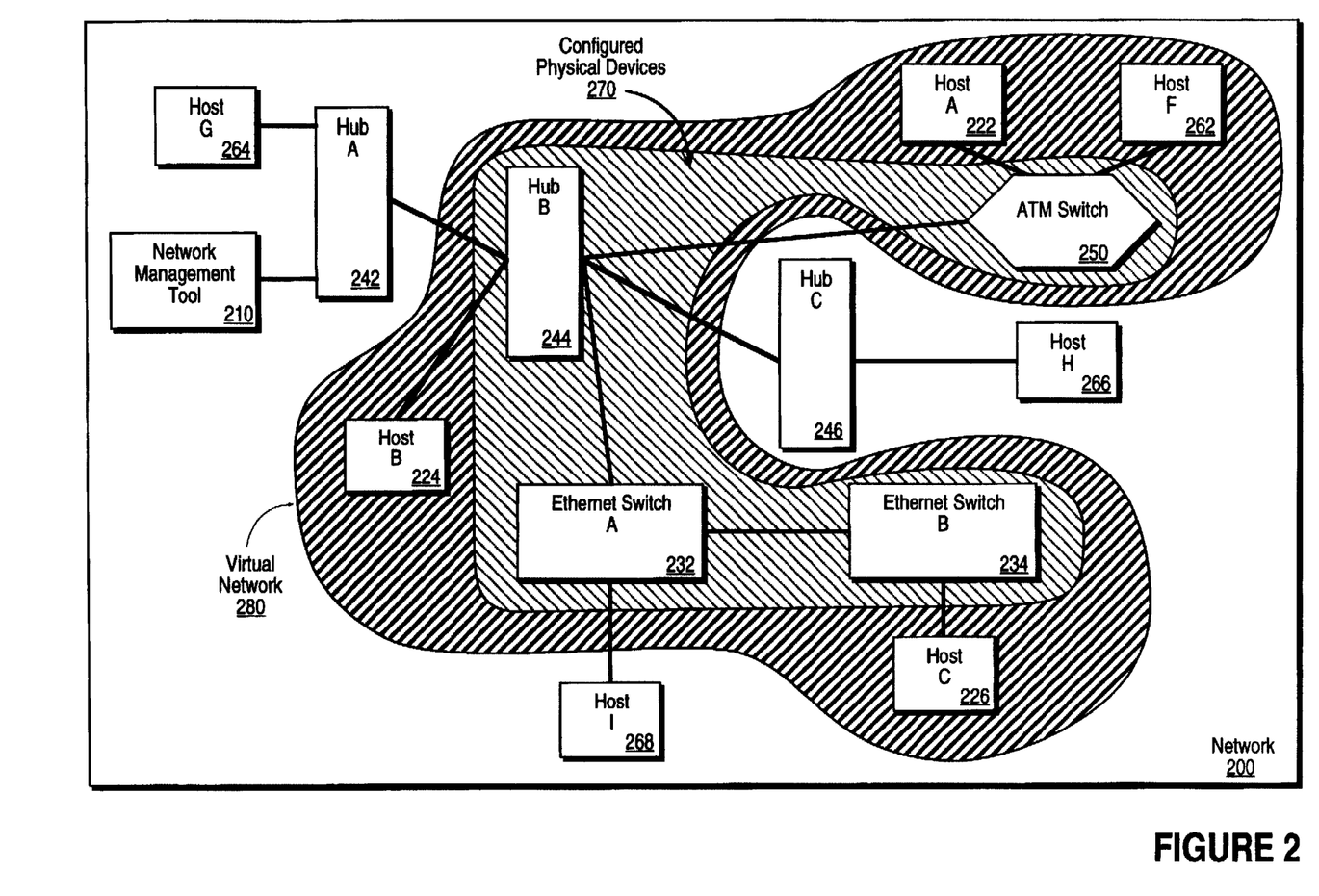
FIG. 2 illustrates a network including a network management tool.

FIG. 2 illustrated a network 200 having hosts, physical devices, and a network management tool 210.

In one embodiment of the present invention, the network management tool 210 includes an application that allows the network administrator to provide the network management tool 210 with a set of hosts (in this example, host A222, host B224 and host C226) that are to be part of one virtual network. The network management tool 210 communicates with the physical devices in the network 200 to determine:

the capabilities of the physical devices in the network 200 (for example, an ATM device requires configuration information different from a shared media device); the necessary configuration information for each physical device; and, the physical connection of the devices. The management tool 210 attempts to determine at least one possible set of physical devices that will support the virtual network. The network management tool 210 configures that set of physical devices to create the virtual network (vnet). Note the network management tool 210 saves the network administrator from having to attempt to configure the network 200. Without requiring further intervention by the network administrator, the network management tool 210 will configure the physical devices supporting the virtual network or will indicate that the virtual network cannot be created.

Network 200 includes the following hosts: host A 222, host B 224, host C 226, host F 262, host G 264, host H 266 an host I 286. Each host can be a computer such as computer system 100. Network 200 includes the following physical devices: ethernet switch A 232, ethernet switch B 234, hub A 242, hub B 244, hub C 246 and ATM switch 250. An ethernet switch can be, for example, model 28115 LattisSwitch, available from Bay Networks, Inc., of Santa Clara, Calif. A hub can be, for example, System 5000, available from Bay Networks, Inc. An ATM switch 250 can be, for example, model 10114, Lattis Cell, available from Bay Networks, Inc. Note that separate physical devices can be enclosed in one chassis yet still be considered separate physical devices.

Assume that the network administrator wishes to connect host A 222, host B 224 and host C 226 as one virtual network. Host A 222, host B 224, and host C 226 may be the computers used by the people of the finance department in a company. To create the virtual network, the network administrator would typically input the request to the network management tool 210. The network management tool 210 would then, after performing the processes described below, create the virtual network 280. The virtual network is created by identifying the physical devices that need to be configured, and then configuring those physical devices. In this example, ethernet switch B 234, ethernet switch A 232, hub B 244, and ATM switch 250 (configured physical devices 270), would all be configured by the network management tool 210 to create the virtual network 280. Note that hub A 242 and hub C 246 would not be configured because the network management tool 210 would determine that no configuration of these physical devices was necessary.

In prior art systems, the network administrator would have to determine which physical devices should be configured and then configure those physical devices. In a network the size of network 200, this may not be too time consuming (for example, the physical devices may be located in different building or even different cities). However, in a larger network, determining how to configure the physical devices in the network to achieve a virtual network can be difficult and time consuming. The network administrator: needs to have an up to date view of the network; must determine how to configure the physical devices on the network to achieve a virtual network; and must issue the commands to configure those physical devices. When the network includes loops (i.e. multiple paths between two devices), the complexity of the problem increases. This introduces multiple solutions to the problem of creating the virtual network. The network administrator may not discover the best configuration of physical devices to create the virtual network. One embodiment of the present invention determines the best configuration of physical devices even when loops are present in the network.

DETERMINING PHYSICAL CONNECTIONS

Figure 3:
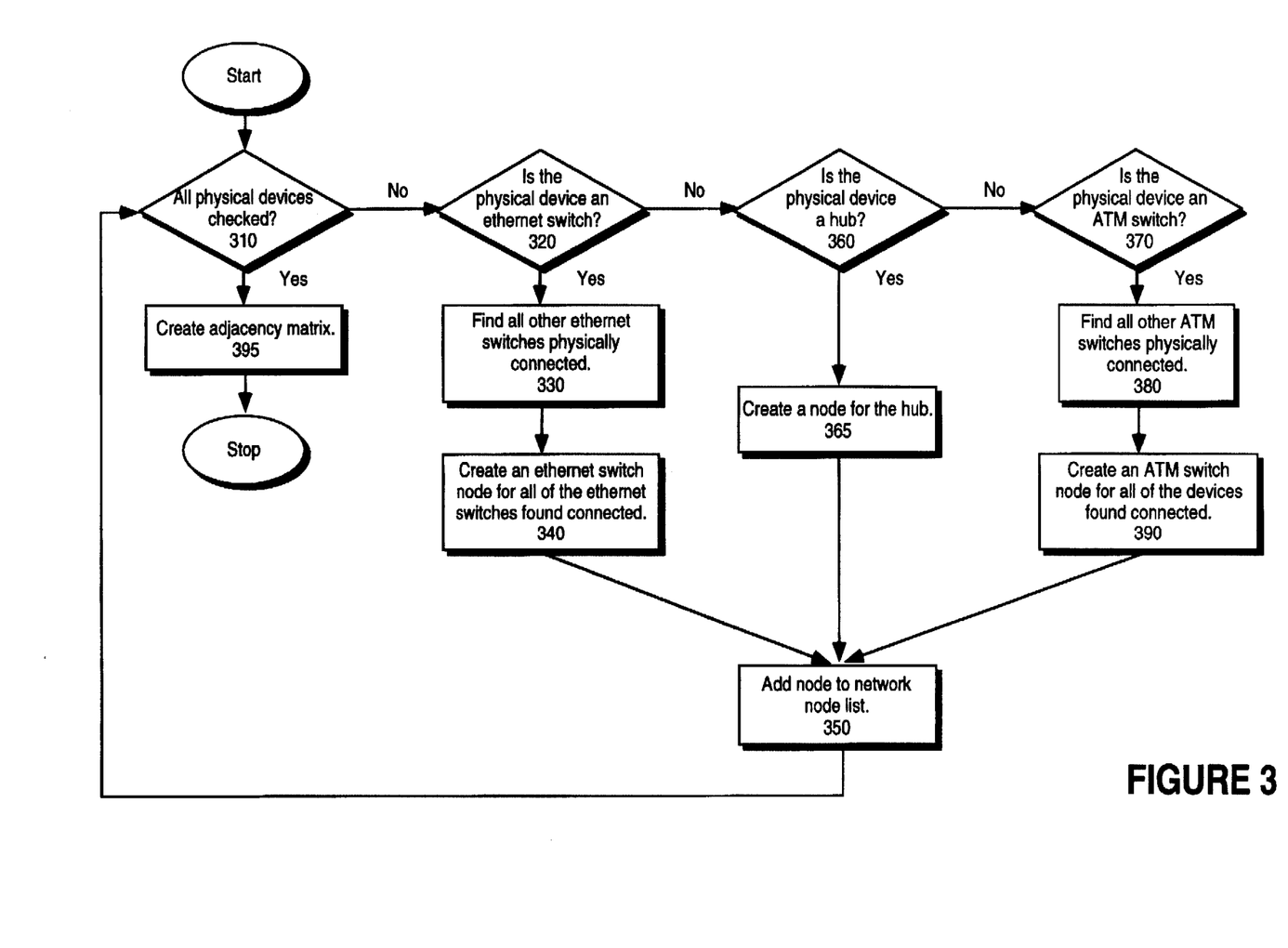
FIG. 3 illustrates one embodiment of a method of determining the physical connections in a network.

FIG. 3 illustrates one embodiment of a method of determining the physical connections in a network. This method could be implemented in an network management tool 210 executing on a computer system 100.

At step 310, a test is made to determine whether all the physical devices in the network have been processed. In one embodiment, this is performed by the network management tool 210 accessing a database. The database contains a list of all the physical devices in the network and all the physical interconnections between the physical devices. Such a database can be created by the network administrator. In another embodiment, the information includes a topology which is obtained from an autotopology system. One such autotopology system, Optivity, is available from Bay Networks, Inc., of Santa Clara, Calif. Such an autotopology system determines all the physical devices on the network and their physical interconnections. In any case, what is important in step 310 is that the physical devices in the network and their interconnections are identified.

If all the physical devices have been processed, then step 320 through step 390 create nodes representing one or more physical devices. Some physical devices can be grouped into a single node where those physical devices can configure themselves to create a path between any two connections to the group. This reduces the complexity of the creation of a vnet because fewer nodes need be processed later on.

At step 320, a test is made to determine whether the physical device is an ethernet switch. If the physical device is an ethernet switch, then at step 330 all the ethernet switches physically connected to that ethernet switch are found. At step 340, an ethernet switch node is created from all the ethernet switches found connected in step 330. This effectively amalgamates all the ethernet switches, that are physically connected, into one node.

At step 350, the newly created node is added to a network node list.

If the physical device is not an ethernet switch, then a test at step 360 is performed to determine whether the physical device is a shared media hub such as a System 3000 available from Bay Networks, Inc. If the physical device is a shared media hub, then at step 365, the network management tool creates a node for the shared media hub. Next, at step 350, the new node is added to the network node list.

If the physical device is neither an ethernet switch nor a shared media hub, then a test is made at step 270 to determine whether the physical device is an ATM switch. If the physical device is an ATM switch, then at step 380, all the other ATM switches physically connected to that ATM switch are found. Next, at step 390, and ATM switch node is created from all the ATM switches connected to the ATM switch of step 370. This is analogous to step 340. Then, at step 350, the new node is added to the network node list.

In another embodiment, other types of physical devices can be identified by a node. For example, a token ring network physical device could be identified by a node. A token ring node would then be added to the network node list.

Once all the physical devices have been included in a node in the network node list, then, from step 320, step 395 is executed. At step 395, an adjacency matrix is created for the network node list. The adjacency matrix is created for each node in the network node list. The adjacency matrix includes, for each node, the list of other nodes that are physically connected to that node. That is, the adjacency matrix identifies the physically connected peers for each node in the network. This adjacency matrix can then be used to determine the required virtual network.

In another embodiment of the present invention, the adjacency matrix includes weights. In one embodiment, a weight of one represents no connection. A weight less than one represents a particular type of communications media/ amount of bandwidth. In one embodiment, lower weights are given to faster communications links. Therefore, in one embodiment, when presented with multiple possible configurations for a virtual network, the network management tool 210 can compare the weights of the configurations to determine the best configuration. The best configuration would be the one with the lowest value.

Note that many different criteria can be used to determine the best path. For example, the best path may use physical devices experiencing the least load.

This invention is not limited to, for example, using weights of decreasing value. What is important is that some correlation between the physical characteristics of the physical devices of the network and some objective criteria required by the network administrator can be determined.

DETERMINING A PATH

Figure 4:
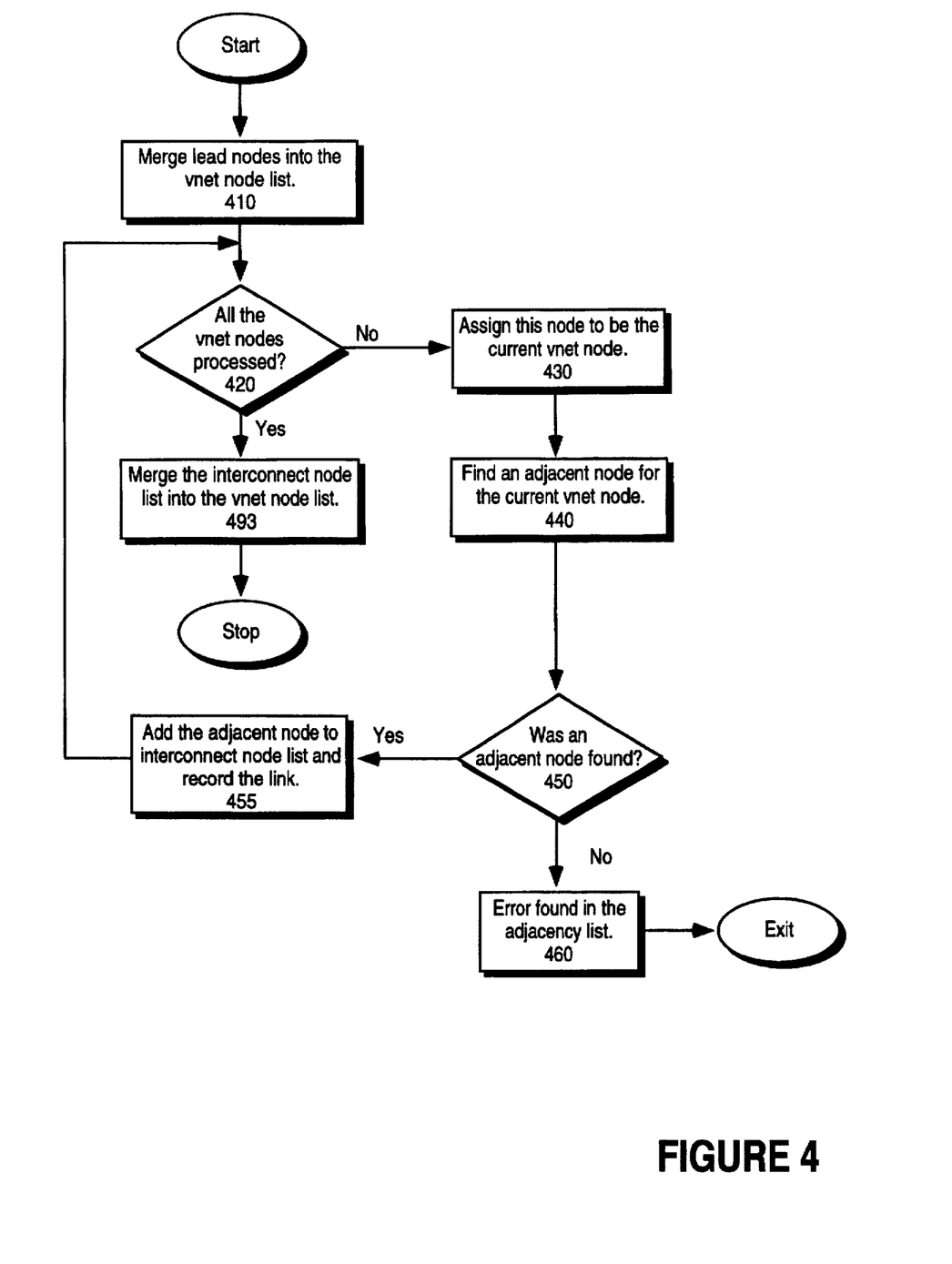
FIG. 4 illustrates one embodiment of a method of determining the path to connect virtual network nodes.

FIG. 4 illustrates one embodiment of a method of determining the path to connect the nodes of virtual network. The path includes a set of physical devices and the connections between the physical devices. This embodiment can be executed by network management tool 210 executing on computer system 100.

This embodiment determines the best path by determining the smallest set of nodes needed to connect the host of the virtual network. Because each virtual network uses the smallest set of nodes the physical devices in the network are used to their fullest potential. This helps keep the number of physical devices required in the network to a minimum, thereby reducing the cost of the network. Also, because the smallest set of nodes is found, the configuration time is kept to a minimum. This allows a network administrator more time to experiment with different virtual networks.

As mentioned above in another embodiment, the best path may be determined using other criteria (e.g. fastest communications path, most available bandwidth path, most amount of resources available path).

At step 410, the nodes coupling to the hosts (the leaf nodes) are added to the vnet node list. (Each host is connected to one node in the network.) The leaf node list can be generated when the network node list is created.

At step 420, a test is made to determine whether all the leaf nodes have been processed in the vnet node list. If all the leaf nodes have not been processed, then step 430; is executed.

At step 430, a node from the vnet node list is assigned to be the current vnet node.

At step 440, an adjacent node to the current vnet node is searched for. This is described in FIG. 5.

At step 450, a test is made to determine whether an adjacent node has been found. If an adjacent node is found, then, at step 455, the adjacent node is added to the interconnect node list. The necessary link is also recorded. If the adjacent node is already in the interconnect node list, and the corresponding link has been noted, then no further action is taken. If no adjacent node is found, then at step 460, an error is noted in the adjacency list. This indicates that the virtual network cannot be created given the present physical devices and interconnections of the network.

At step 493, the interconnect node list is merged into the vnet node list. The vnet node list represents the set of nodes needed to create the required virtual network, while the recorded links indicate how the vnet node list nodes are connected to form the vnet.

Figure 5:
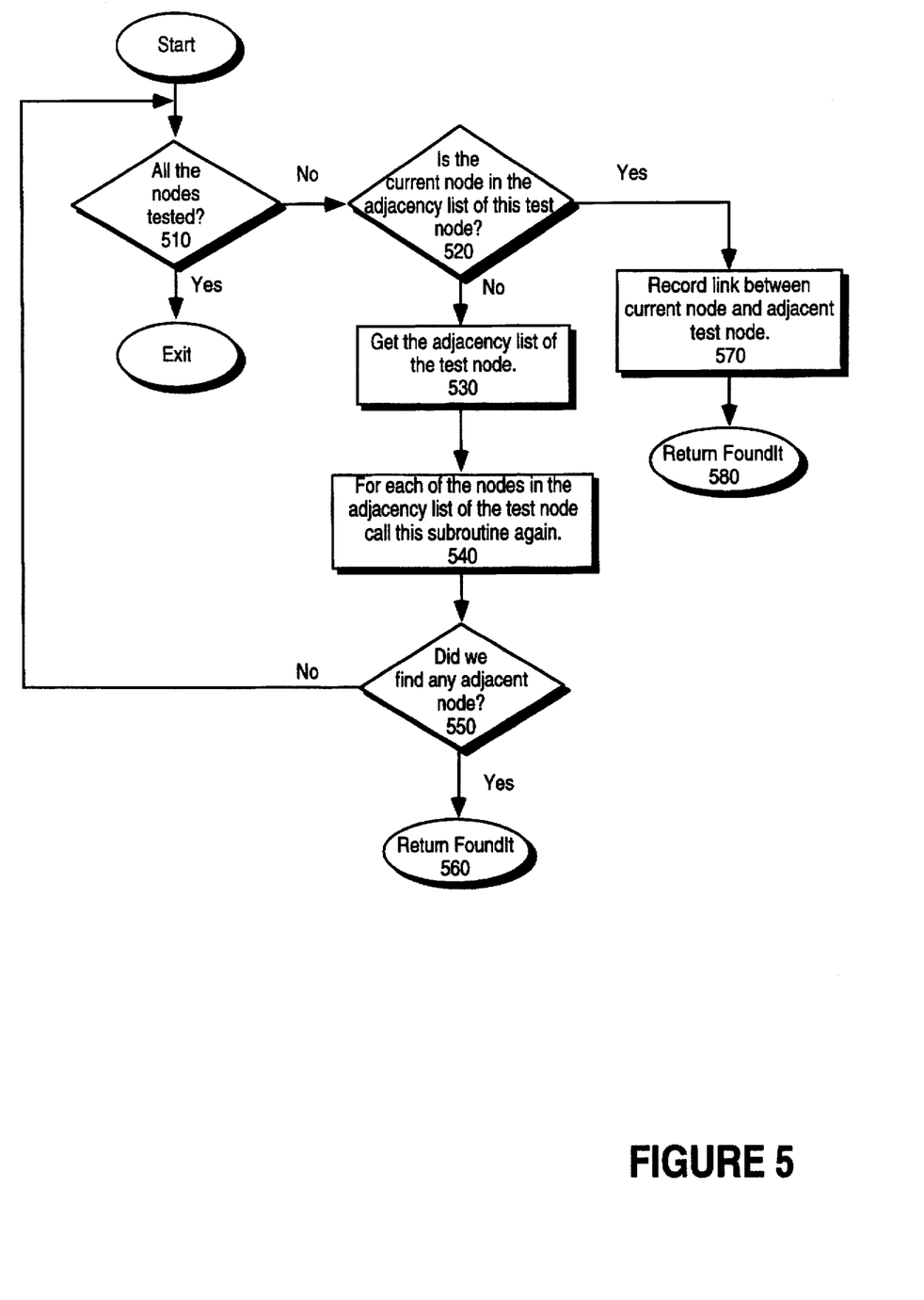
FIG. 5 illustrates one embodiment of a method of finding an adjacent node for the current vnet node.

FIG. 5 illustrates one embodiment of a method of finding an adjacent node for a node. In one embodiment of the present invention, the method of FIG. 5 is implemented in a subroutine that has an input a list of nodes. When called from step 440, the input to this subroutine is the current vnet node, the vnet node list and the interconnection node list.

At step 510, a test is made to determine whether all the nodes in the node list have been tested.

Assuming all the nodes have not been tested, then at step 520, a test is made to determine whether the test node is in the adjacency list of the present node. In one embodiment of the present invention this is performed by addressing the adjacency matrix using the test node and the present node. Optionally, if the test node is in the adjacency list of the present node, then at step 570, a link is recorded between the present node and the test node. This recording can be done in an interconnect node list. Then at step 580, a return from the subroutine is made indicating that an adjacent node (the test node) has been found.

At step 530, if the test node is not in the adjacency list of this leaf node, then the adjacency list of the test node is accessed.

At step 540, this subroutine is called for each of the nodes in the adjacency list of the test node.

At step 550, a test is made to determine whether an adjacent node has been found. If an adjacent node has been found, then at step 560, the subroutine returns indicating that an adjacent node has been found. If an adjacent node has not been found, then step 510 is executed.

If all the leaf nodes have been tested and an adjacent node has not been found, then the subroutine exists indicating that no adjacent node has been found.

RESOURCE AVAILABILITY

Figure 6:
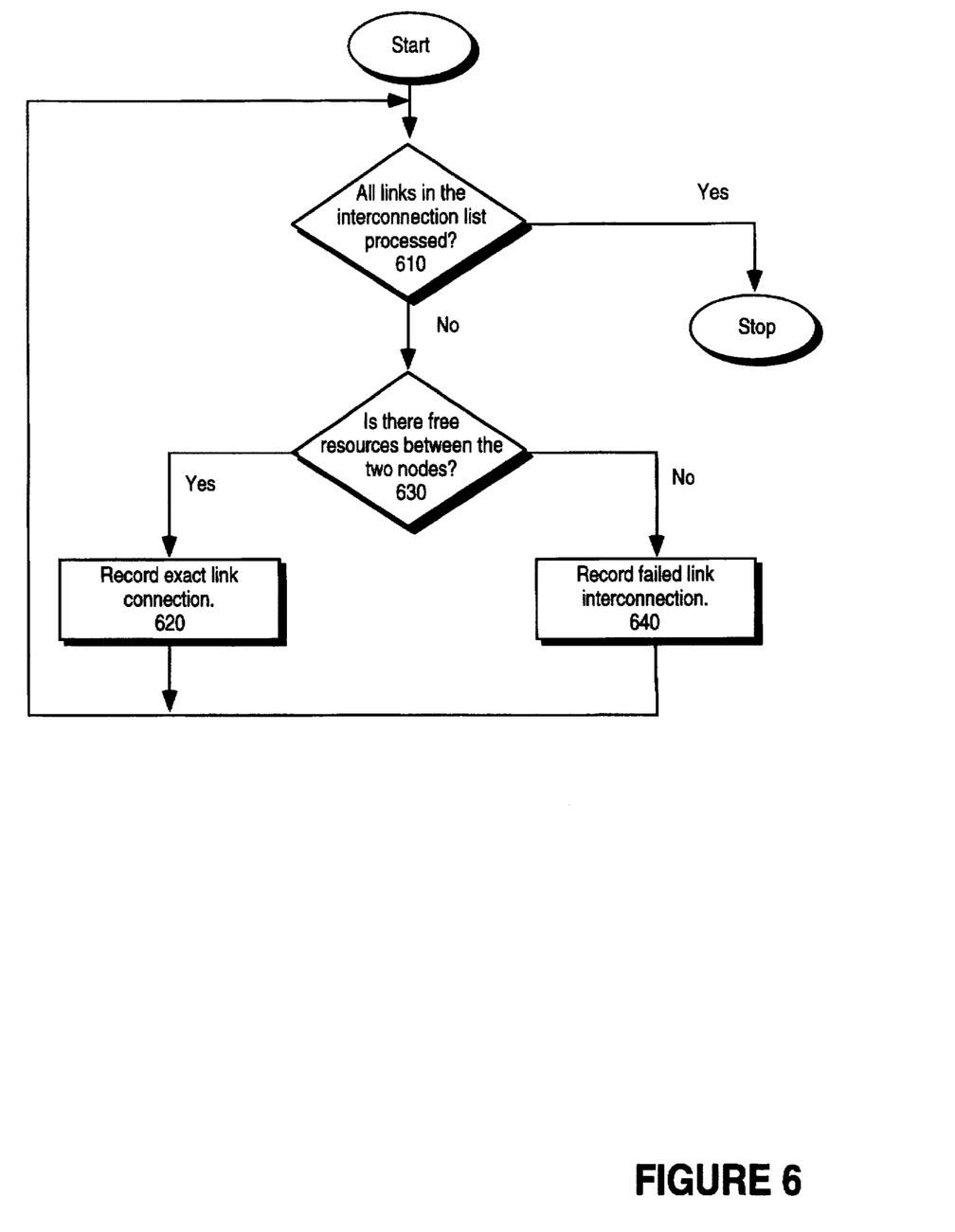
FIG. 6 illustrates on embodiment of a method of determining resource availability in a network.

FIG. 6 illustrates one embodiment of a method for determining the resource availability of a network. That is, the physical devices used to create the virtual network must be able to support the links in the path of the virtual network. The method of FIG. 6 can be performed by the network management tool 210 executing on computer system 100.

At step 610, a test is performed to determine whether all the links in the interconnection list have been processed. If not all the links have been processed, then at step 630, a test is made to determine whether there are resources available between the two nodes that form the link. In one embodiment of the present invention, this is done by accessing the database used in FIG. 3. The database indicates whether physical devices have sufficient resources to make a link. For example, the first physical device might be a hub having a coaxial connection. A second physical device might be another hub having a coaxial connection. The two hubs would be physically connected via a coaxial cable. The test of step 630 would then determine whether the coaxial cable is available for use for the virtual network.

If the resources are available, then at step 620, the exact link connection is recorded. However, if the resources are not available between the two nodes, then at step 640, a record is kept of a failed link interconnection. Step 610 through step 640 are executed for each link in the interconnection list. If there are any failed links then these links can be displayed for the network administrator. The failed links indicate that a particular connection between two physical devices is not available. The network administrator may then modify the network to allow the network to be configured to create the virtual network.

In one embodiment of the present invention not only must the resources between the nodes be tested, but, where a shared media hub is to be a configured physical device 370, the resources within the hub must be tested as well. For example in one type of shared media hub a finite number of ports may be interconnected on that particular hub. Therefore, although two physical devices may be physically connected by ports and those two physical devices may have that resource available, one of the two hubs may not be able to internally support a connection to one of the ports. Therefore, the link could not be made. This failure would then be recorded for the network administrator.

PHYSICAL DEVICE CONFIGURATION

Once the vnet node list has been created, the nodes in that list can be configured to implement the vnet. In one embodiment of the present invention, each node is configured by the network management tool 210 using the link information from the connections list. The following pseudo code illustrates one embodiment of a method for configuring the nodes given the vnet list.

```
create an empty list of configurations done.
for (each vnet node)
{
    switch (get type of physical device)
    {
        case physical device_type_1 :
            configure_physical device_type_1;
        case physical device_type_2 :
            configure_physical device_type_2;
        ....
    }
    tag configuration as done
}
if (all configuration done) then
    exit algorithm
else
    unconfigure the nodes
```

In one embodiment of the present invention, if all the nodes cannot be configured, then an attempt to undo the configuration is made. If this is not possible, or if the network administrator does not want this done, then the network management tool displays an error message.

MODIFICATIONS OF A VNET

The modification of an already existing vnet is performed using a method similar to the creation of the vnet. For simplicity, the modification method will be described in terms of a one host move or reassignment.

```
find leaf node that host is part of
if (leaf node already has this vnet in it) then
{
    check the node configuration to determine
        whether the host can be added or not
    if (OK)
        configure the node
}
else
{
    follow the creation algorithm
}
```

Notice, that the modification will be performed the same way as the vnet creation if the host's leaf node is not part of the vnet.

EXAMPLE NETWORK 1

Figure 7:
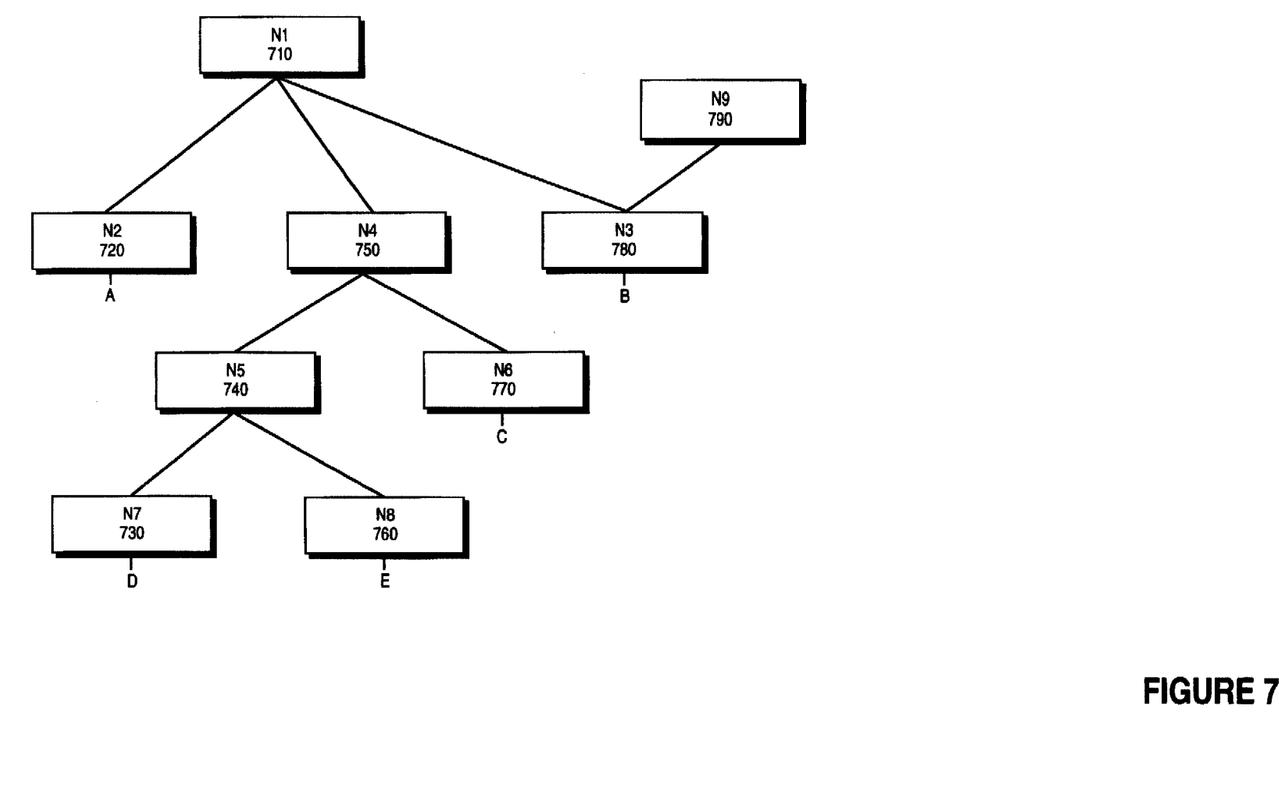
FIG. 7 illustrates a network that can be configured to support a virtual network.

FIG. 7 illustrates a network upon which one embodiment of the present invention can operate. This network includes a number of hosts which are to be connected in a vnet. To create the vnet, the physical devices on the network need to be configured.

The physical devices of this network have already been converted into nodes using the method of step 310 through step 390. In this example, no physical devices can be grouped with other physical devices (as in step 340 and step 390). Lines between the nodes represent physical connections.

This paragraph describes the interconnections of the network of FIG. 7. Nodes are represented by the letter N. The network of FIG. 7 contains both configuration nodes and hosts. Hosts A B, C, D and E are to be included in one vnet. The network includes configuration nodes N1 710, N2 720, N3 780, N750, N5 740, N6 770, N7 730, N8 760 and N9 790. N1 710 is physically connected to N2 720, N4 750 and N3 780. N2 720 is connected to N1 710 and A. N3 780 is connected to N9 790, N1 710 and B. N4 750 is connected to N1 710, N5 740 and N6 770. N5 740 is connected to N4 750, N7 730 and N8 760. N6 770 is connected to N4 750 and C. N7 730 is connected to D and N5 740. N8 760 is connected to N5 740 and E.

Before executing the remaining steps of FIG. 3, the status of the various lists is as follows:

| Hosts | A, B, C, D, E |
| Lead Node List | Empty |
| Interconnect Node List | Empty |
| Vnet Nodes List | Empty |
| Interconnection List | Empty |

After executing steps 310 through step 390, the status of the lists is as follows:

| Hosts | A, B, C, D, E |
| Lead Node List | N2, N3, N6, N7, N8 |
| Interconnect Node List | Empty |
| Vnet Nodes List | Empty |
| Interconnection List | Empty |

The embodiment of FIG. 3 creates the adjacency matrix below. An "x" indicates an adjacency.

| | N1 710 | N2 720 | N3 780 | N4 750 | N5 740 | N6 770 | N7 730 | N8 760 | N9 790 |
|---|---|---|---|---|---|---|---|---|---|
| N1 710 | | x | x | x | | | | | |

|     | N1  | N2  | N3  | N4  | N5  | N6  | N7  | N8  | N9  |
|-----|-----|-----|-----|-----|-----|-----|-----|-----|-----|
|     | 710 | 720 | 780 | 750 | 740 | 770 | 730 | 760 | 790 |
| N2 720 | x |   |   |   |   |   |   |   |   |
| N3 780 | x |   |   |   |   |   |   | x |   |
| N4 750 | x |   |   |   | x | x |   |   |   |
| N5 740 |   |   |   | x |   |   | x | x |   |
| N6 770 |   |   |   | x |   |   |   |   |   |
| N7 730 |   |   |   |   | x |   |   |   |   |
| N8 760 |   |   |   |   | x |   |   |   |   |
| N9 790 |   | x |   |   |   |   |   |   |   |

In the embodiment of FIG. 4, at step 410, the leaf nodes N2 720, N3 780, N6 770, N7 730, and N8 760, are added to the vnet node list. Then step 420 through step 450 is repeated for each node in the vnet node list having the following results.

========= First vnet node
Is N2 720 in the adjacency list of N3 780, N6 770, N7 730 or N8 760?
No
    Get adjacency list of N2 720 -----> N1 710
        Is N1 710 in the adjacency list of N3 780, N6 770, N7 730 or N8 760
        Yes -----> add N1 710 to the Interconnect Node List and record the link.
Vnet Node List

| N2 720 |
|--------|
| N3 780 |
| N6 770 |
| N7 730 |
| N8 760 |

Interconnect Node List

| N1 710 |
|--------|
|        |
|        |
|        |
|        |

========= Second vnet mode
Is N3 780 in the adjacency list of N2 720, N6 770, N7 730, N8 760 or N1 710
Yes
    complete, do no add anything
Vnet Node List

| N2 720 |
|--------|
| N3 780 |
| N6 770 |
| N7 730 |
| N8 760 |

Interconnect Node List

| N1 710 |
|--------|
|        |
|        |
|        |
|        |

========= Third vnet node
Is N6 770 in the adjacency list of N2 720, N3 780, N7 730, N8 760 or N1 710
No
    Get the adjacency list of N6 770 -----> N4 750
    Is N4 750 in the adjacency list of N2 720, N3 780, N7 730, N8 760 or N1 710
    Yes -----> add N4 750 to the interconnect Node List and record the link.
Vnet Node List

| N2 720 |
|--------|
| N3 780 |
| N6 770 |
| N7 730 |
| N8 760 |

Interconnect Node List

| N1 710 |
|--------|
| N4 750 |
|        |
|        |
|        |

========= Fourth vnet node
Is N7 730 in the adjacency list of N2 720, N3 780, N7 730, N8 760, N1 710 or N4 750
No
    Get the adjacency list of N7 730 -----> N5 740
    Is N5 740 in the adjacency list of N2 720, N3 780, N7 730, N8 760, N1 710 or N4 750
    Yes -----> add N5 740 to the interconnect Node List and record the link.
Vnet Node List.

13
-continued

| N2 |
|---|
| 720 |

| N3 |
|---|
| 780 |

| N6 |
|---|
| 770 |

| N7 |
|---|
| 730 |

| N8 |
|---|
| 760 |

Interconnect Node List

| N1 |
|---|
| 710 |

| N4 |
|---|
| 750 |

| N5 |
|---|
| 740 |

|  |
|---|
|  |

|  |
|---|
|  |

================= Fifth vnet node
Is N8 760 in the adjacency list of N2 720, N3 780, N7 730, N8 760, N1 710, N4 750 or N5 740
Yes
   complete, do not add anything.
Vnet Node List

| N2 |
|---|
| 720 |

| N3 |
|---|
| 780 |

| N6 |
|---|
| 770 |

| N7 |
|---|
| 730 |

| N8 |
|---|
| 760 |

Interconnect Node List

| N1 |
|---|
| 710 |

| N4 |
|---|
| 750 |

| N5 |
|---|
| 740 |

|  |
|---|
|  |

|  |
|---|
|  |

The final results are shown below.

| | |
|---|---|
| Hosts | A, B, C, D, E |
| Lead Node List | N2 720, N3 780, N6 770, |
|  | N7 730, N8 760 |
| Interconnect Node List | N5 740, N4 750, N1 710 |
| Interconnection List | N2 720 -> N1 710 |
|  | N3 780 -> N1 710 |
|  | N6 770 -> N4 750 |
|  | N7 730 -> N5 740 |
|  | N8 760 -> N5 740 |
|  | N4 750 -> N1 710 |
|  | N5 740 -> N4 750 |
| Vnet Nodes List | N1 710, N2 720, N3 780, |
|  | N4 750, N5 740, N6 770, |
|  | N7 760, N8 760 |

Next step 610 through step 640 are executed to ensure that the physical devices identified by each link in the interconnection list have the resources needed to create each link. Finally, the nodes in the vnet node list are configured.

14
EXAMPLE NETWORK 2

Figure 8:
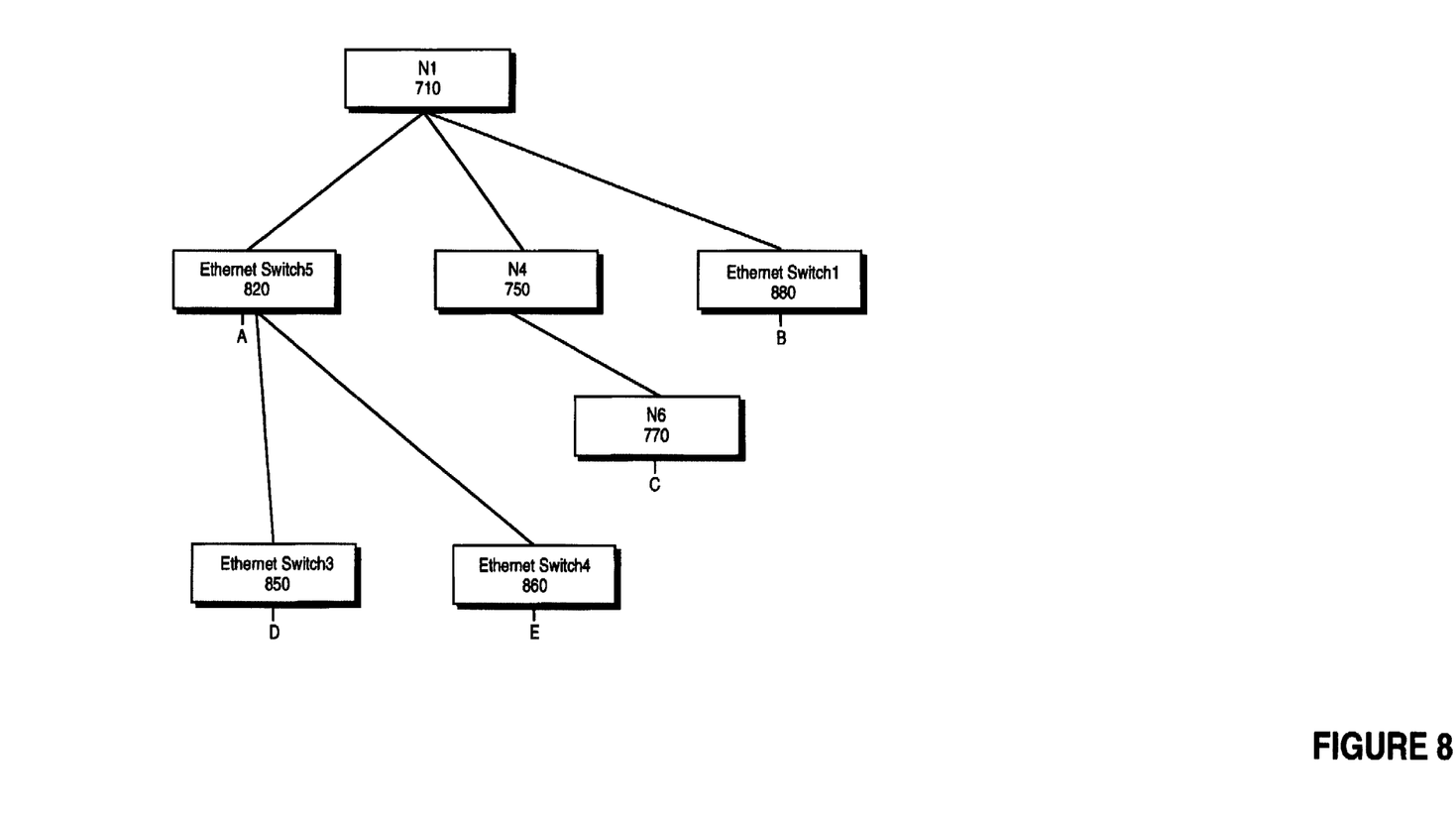
FIG. 8 illustrates a second network that can be configured to support a virtual network.

FIG. 8 illustrates a network similar to the network of FIG. 7. However, the network of FIG. 8 includes physical devices that can be grouped into nodes.

This paragraph describes the interconnections of the network of FIG. 8. The network includes the following physical devices: ethernet switch5 820, ethernet switch1 880, ethernet switch 2 840, ethernet switch3 850 and ethernet switch4 860. The network also includes hosts A, B, C, D and E. N1 710 is physically connected to ethernet switch 5 820, N4 750, N6 770 and ethernet switch 1 880. Ethernet switch 5 820 is physically connected to N1 710, ethernet switch 2 840 and A. N4 750 is physically connected to N1 710 and N6 770. Ethernet switch1 880 is physically connected to N1 710 and B. Ethernet switch2 840 is physically connected to ethernet switch5 820, ethernet switch3 850 and ethernet switch4 860. Ethernet switch3 850 is physically connected to ethernet switch2 840 and D. Ethernet switch4 860 is physically connected to ethernet switch2 840 and E.

Figure 9:
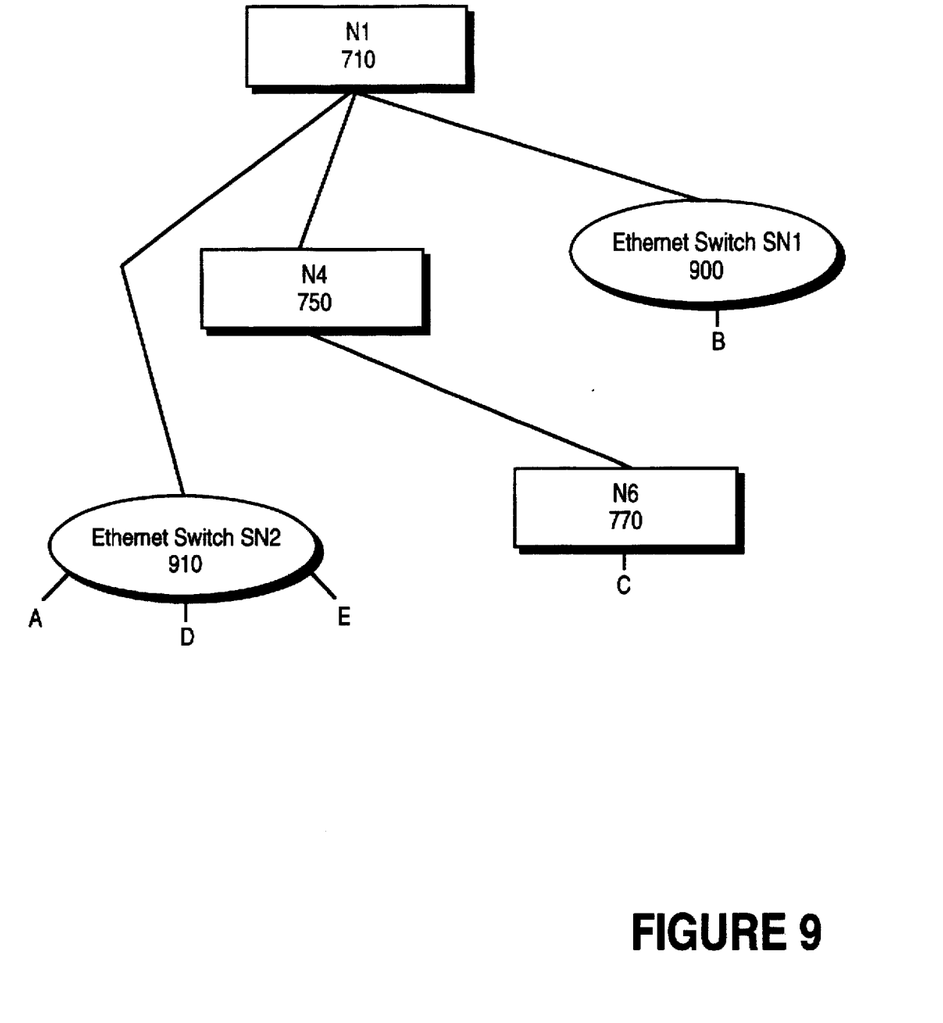
FIG. 9 illustrates the network of FIG. 8 after grouping physical devices into nodes.

After performing step 310 through step 390, the network of FIG. 8 is logically represented as the network of FIG. 9. When step 320 is executed for ethernet switch 5 820, step 330 and step 340 are performed. Step 330 causes ethernet switch2 840, ethernet switch3 850, and ethernet switch4 860 to be found. Step 340 creates a node ethernet switch SN2 910. Ethernet switch SN2 910 represents a node for these physical ethernet switches. Similarly, ethernet switch1 880, not physically connected with another ethernet switch, is grouped into a separate node ethernet switch SN1 900.

Step 395 then creates the following adjacency matrix.

|  | N1 710 | SN1 900 | N4 750 | N6 770 | SN2 910 |
|---|---|---|---|---|---|
| N1 710 |  | x | x |  |  |
| SN1 900 | x |  |  |  |  |
| N4 750 | x |  |  | x |  |
| N6 770 |  |  | x |  |  |
| SN2 910 | x |  |  |  |  |

Next, leaf nodes are added to the vnet node list, at step 410, and step 420 through step 450 are executed. The following results are achieved.

| | |
|---|---|
| Hosts | : A, B, C, D, E |
| Lead Node List | : SN1 900, SN2 910, N6 770 |
| Interconnect Node List | : Empty |
| Interconnection List | : Empty |

================= First vnet node
Is SN1 900 in the adjacency list of SN2 910 or N6 770?
No
   Get adjacency list of SN1 900 ——> N1 710
      Is N1 710 in the adjacency list of SN2 910 or N6 770
      Yes ——> ad N1 710 to the Interconnect Node List and
         record the link.
Vnet Node List -continued

```
SN1
900
SN2
910
N5
770

```
Interconnect Node List

```
N1
710

```

=========== Second vnet node
Is SN2 910 in the adjacency list of SN1 900, N6 770 or N1 710?
Yes. Complete do not add any nodes to the interconnect node list.
=========== Third vnet node
Is N6 770 in the adjacency list of SN1 900, SN2 910 or N1 710?
Yes. Complete do not add any nodes to the interconnect node list.
The results are:
Hosts                  : A, B, C, D, E
Lead Node List         : SN1 900, SN2 910, N6 770
Interconnect Node List : N1 710
Interconnection List   : SN2 910 -> N1 710
                         N6 770 -> N1 710
                         SN1 900 -> N1 710
Add link counts to Interconnection List:
Hosts                  : A, B, C, D, E
Lead Node List         : SN1 900, SN2 910, N6 770
Interconnect Node List : N1 710, N4 760
                                            Link Counts Interconnection List   : SN2 910 -> N1 710       1
                         N6 770 -> N1 710        1
                         SN1 990 -> N1 710       1
```

Ensure that there is at least one free link available.

After ensuring that sufficient resources are available, the network is configured as described above.

A method and apparatus for determining a connection path between two physical devices in a heterogeneous network has been described.

What is claimed is:

1. A method of configuring a network, said method comprising the steps of:
   (a) generating a set of leaf nodes, a first leaf node representing a first physical device being coupled to a first host on said network;
   (b) generating an adjacency matrix for said set of leaf nodes;
   (c) generating a set of virtual network nodes by using said adjacency matrix, said set of virtual network nodes connecting said set of leaf nodes;
   (d) determining a resource availability for said set of virtual network nodes; and
   (e) configuring said set of virtual network nodes in response to said determining said resource availability.

2. The method of claim 1 further comprising the step of generating a set of network nodes, said set of network nodes including a node corresponding to each physical device of a plurality of physical devices.

3. The method of claim 2 wherein the step of generating said set of network nodes further comprises the steps of:
   (a) determining a type of a physical device of said plurality of physical devices;
   (b) identifying other physical devices of said type of said plurality of physical devices and said physical device as a group, said other physical devices being connected to said physical device; and,
   (c) generating a network node representing said group.

4. The method of claim 2 further comprising the step of generating said adjacency matrix from said set of network nodes.

5. The method of claim 1 wherein said generating said set of virtual network nodes comprises the steps of:
   (a) merging said set of leaf nodes into said set of virtual network nodes;
   (b) for each virtual network node in said set of virtual network nodes, performing the steps of:
      (i) finding an adjacent node for each virtual network node, and
      (ii) adding said adjacent node to an interconnect node set; and
   (c) merging said set of virtual network nodes and said interconnect node set.

6. The method of claim 1 further comprising the step of determining a link availability between each virtual network node in said set of virtual network nodes.

7. A network management tool comprising:
   (a) a means for determining a set of nodes corresponding to said set of physical devices;
   (b) a means for generating an adjacency matrix for said set of nodes;
   (c) a means for determining a set of virtual network nodes representing a subset of said set of physical devices that implement said virtual network, said means using said adjacency matrix;
   (d) a means for determining a resource availability for said set of virtual network nodes; and
   (e) a means for configuring said subset of physical devices to implement said virtual network.

8. The network management tool of claim 7 wherein said means for determining said set of nodes corresponding to said set of physical devices further comprises:
   (a) a means for determining a type of a first physical device of said set of physical devices;
   (b) a means for grouping other physical devices of said type of said set of physical devices, said other physical devices being connected to said first physical device; and
   (c) a means for generating a network node representing said first physical device and said other physical devices.

9. The network management tool of claim 7 wherein said means for determining said set of virtual network nodes comprises:
   (a) a means for determining a set of leaf nodes, a leaf node of said set of leaf nodes corresponding to each physical device in said virtual network; and
   (b) a means for determining a subset of said physical devices that connect said set of leaf nodes.

10. The network management tool of claim 7 further comprising a means for determining a link availability between each virtual network node of said set of virtual network nodes.

11. A method of configuring a plurality of physical devices to form a virtual network, said method comprising the steps of:
   (a) communicating with said plurality of physical devices to determine a topology of said plurality of physical devices, said topology comprising a list of said plurality of physical devices and a list of corresponding physical interconnections;
   (b) generating a plurality of network nodes from said topology;
   (c) generating a plurality of leaf nodes from said topology and a plurality of terminals coupled to said plurality of physical devices;
   (d) determining a plurality of interconnect nodes from said plurality of leaf nodes and said plurality of network nodes; and
   (e) configuring said plurality of leaf nodes and said plurality of interconnect nodes to support said virtual network.

12. The method of claim 11 wherein said generating said plurality of network nodes comprises the following steps:
   if a first physical device is a first physical device type, then:
   (a) finding all other physical devices from said plurality of physical devices that are physically connected to said first physical device and are said first physical device type; and,
   (b) creating a first network node representing said first physical device and said all other physical devices.

13. The method of claim 12 wherein said first physical device type is an ethernet switch.

14. The method of claim 12 wherein said first physical device type is a hub.

15. The method of claim 12 wherein said first physical device type is an ATM switch.

16. The method of claim 11 further comprising the step of:
   creating an adjacency matrix representing said plurality of network nodes and physical interconnections between said plurality of network nodes.

17. The method of claim 11 wherein said determining said plurality of interconnect nodes comprises, for each leaf node, the steps of:
   (a) finding an adjacent node that connects to said leaf node, and
   (b) adding said adjacent node to said plurality of interconnect nodes.

18. The method of claim 11 wherein said configuring said plurality of leaf nodes and said plurality of interconnect nodes comprises the step of testing each link of said virtual network to determine whether sufficient free resources exist between said plurality of leaf nodes and said plurality of interconnect nodes.

19. The method of claim 11 wherein said configuring said plurality of leaf nodes and said plurality of interconnect nodes comprises the step of communicating configuration information to each of said plurality of leaf nodes and said plurality of interconnect nodes.

20. A computer-readable medium having a plurality of sequences of instructions stored thereon including sequences of instructions which, when executed by one or more processors, cause said one or more processors to perform the steps of:
   (a) generating a set of leaf nodes, a first leaf node representing a first physical device being coupled to a first host on said network;
   (b) generating an adjacency matrix for said set of leaf nodes;
   (c) generating a set of virtual network nodes by using said adjacency matrix, said set of virtual network nodes connecting said set of leaf nodes;
   (d) determining a resource availability for said set of virtual network nodes; and
   (e) configuring said set of virtual network nodes in response to said determining said resource availability.

21. The computer-readable medium of claim 20 further causing the step of generating a set of network nodes, said set of network nodes including a node corresponding to each physical device of a plurality of physical devices.

22. The computer-readable medium of claim 20 wherein the step of generating said set of network nodes further comprises the steps of:
   (a) determining a type of a physical device of said plurality of physical devices;
   (b) identifying other physical devices of said type of said plurality of physical devices and said physical device as a group, said other physical devices being connected to said physical device; and,
   (c) generating a network node representing said group.

23. The computer-readable medium of claim 21 further causing the step of generating said adjacency matrix from said set of network nodes.

24. The computer-readable medium of claim 20 wherein the step of generating said set of virtual network nodes comprises the steps of:
   (a) merging said set of leaf nodes into said set of virtual network nodes;
   (b) for each virtual network node in said set of virtual network nodes, performing the steps of:
      (i) finding an adjacent node for each virtual network node, and
      (ii) adding said adjacent node to an interconnect node set; and
   (c) merging said set of virtual network nodes and said interconnect node set.

25. The computer-readable medium of claim 20 further causing the step of determining a link availability between each virtual network node in said set of virtual network nodes.

26. A computer data signal embodied in a carrier wave and encoding a plurality of sequences of instructions which, when executed by one or more processors, cause said one or more processors to configure a virtual network, said plurality of sequences of instructions including sequences of instructions which, when executed by said one or more processors, cause said one or more processors to perform the steps of:
   (a) generating a set of leaf nodes, a first leaf node representing a first physical device being coupled to a first host on said network;
   (b) generating an adjacency matrix for said set of leaf nodes;
   (c) generating a set of virtual network nodes by using said adjacency matrix, said set of virtual network nodes connecting said set of leaf nodes;
   (d) determining a resource availability for said set of virtual network nodes; and
   (e) configuring said set of virtual network nodes in response to said determining said resource availability.

27. The computer data signal of claim 26 further causing the step of generating a set of network nodes, said set of network nodes including a node corresponding to each physical device of a plurality of physical devices.

28. The computer data signal of claim 26 wherein the step of generating said set of network nodes further comprises the steps of:
(a) determining a type of a physical device of said plurality of physical devices;
(b) identifying other physical devices of said type of said plurality of physical devices and said physical device as a group, said other physical devices being connected to said physical device; and,
(c) generating a network node representing said group.

29. The computer data signal of claim 27 further causing the step of generating said adjacency matrix from said set of network nodes.

30. The computer data signal of claim 26 wherein the step of generating said set of virtual network nodes comprises the steps of:

(a) merging said set of leaf nodes into said set of virtual network nodes;
(b) for each virtual network node in said set of virtual network nodes, performing the steps of:
 (i) finding an adjacent node for each virtual network node, and
 (ii) adding said adjacent node to an interconnect node set; and
(c) merging said set of virtual network nodes and said interconnect node set.

31. The computer data signal of claim 26 further causing the step of determining a link availability between each virtual network node in said set of virtual network nodes.

* * * * *